United States Patent Office 3,439,027
Patented Apr. 15, 1969

3,439,027
PRODUCTION OF AROMATIC CARBOXYLIC ACIDS AND THEIR ALKALI METAL SALTS
James W. Patton and Marion O. Son, Jr., Littleton, Colo., assignors to Marathon Oil Company, Findlay, Ohio, a corporation of Ohio
Filed Dec. 23, 1964, Ser. No. 420,503
Int. Cl. C07c 63/02, 51/42, 63/50
U.S. Cl. 260—524  12 Claims This invention relates to new processes for the production of carboxylic acids and their metal salts by oxidation of the corresponding alkylaromatics, and more particularly to processes involving the treatment of the oxidation products with ion exchange resins prior to acidification.

The known processes for the preparation of carboxylic acids by oxidation of alkylaromatics involve considerable waste of the mineral acid commonly used in acidification of the oxidation products. This waste occurs because of the acid consumed in the neutralization of the byproducts which are formed during the oxidation step. The present invention permits the preparation of aromatic acids with minimum consumption of acid by utilizing ion exchange resins to separate the products of the oxidation step prior to acidification. These ion exchange resins accomplish the dual purpose of neutralizing the oxidation products and also of permitting the separation of the desired aromatic intermediates from the undesired oxidation by-products prior to acidification.

In addition, preferred embodiments of the present invention permit the oxidation step to be carried out with $CO_2$ evolved during treatment of the oxidation products with the above mentioned ion exchange resins.

The present invention is a process for manufacture of alkylaromatic acids comprising the steps of:
(a) Oxidizing the corresponding alkylaromatic compound preferably in an aqueous media;
(b) Neutralizing the basic constituents of the product of the oxidation by passing the product through a weak protonic ion exchange resin;
(c) Thereafter acidifying the product; and
(d) Recovering the resulting alkylaromatic acids.

In preferred embodiments of the invention, the oxidation is accomplished in the presence of alkali metal chromates. The $CO_2$ which is evolved during treatment with the weak protonic ion exchange resin is recovered and is used in conjunction with alkali metal chromate to oxidize additional quantities of alkylaromatic compounds.

Particularly preferred for the practice of the present invention are weakly protonic (acid-type) ion exchange resins which may be regenerated with $CO_2$, thus permitting an economically attractive cyclic process. The most preferred ion exchange resins are the carboxylic acid types.

In a particularly preferred embodiment of the present invention, the regeneration of the weak protonic ion exchange resin subsequent to the neutralization of the reaction product formed by the oxidation of alkylaromatic compounds in the presence of $CO_2$ and an alkali metal chromate yields an alkali metal bicarbonate. This alkali metal bicarbonate is then utilized in the manufacture of additional chromates, and $CO_2$. This latter embodiment thus permits reutilization of both the $CO_2$ and bicarbonate by-products and permits the oxidation of the alkylaromatic compounds to be carried out with virtually full recovery of $CO_2$, alkali metal chromate, and ion exchange resin; make-up quantities of these materials being added only to offset minor process losses and deviations from the theoretical reactions.

Because of the reutilization of the reagents used in the production of the alkylaromatic acids, the present invention permits highly economical production of the acids.

This invention may be employed advantageously with a wide variety of alkylaromatics including among others, monoalkyl benzenes such as toluene, ethyl benzene, propyl benzene and butyl benzene; dialkyl benzenes such as dimethylbenzenes, diethylbenzenes, dipropylbenzenes and dibutylbenzenes; and other polyalkyl benzenes such as trimethylbenzenes, triethylbenzenes, and tripropylbenzenes; monoalkyl naphthalenes such as methyl-, ethyl-, and propylnaphthalenes, dialkyl naphthalenes such as dimethyl-, diethyl-, and dipropylnaphthalenes; polyalkyl naphthalenes such as trimethylnaphthalenes, tetramethylnaphthalenes, and dimethyldiethylnaphthalenes; and the corresponding Tetralin derivatives, alkyl phenanthrenes, alkyl anthracenes, etc. Especially preferred are the mono and dialkyl benzenes and naphthalenes wherein the alkyl groups contain from 1 to about 6 carbon atoms, and of these, those having methyl groups are most preferred.

Although the oxidation of the alkylaromatic hydrocarbons is exemplified by the air-alkali metal carbonate process and by the $CO_2$-chromate process, other oxidation processes may be employed within the scope of the present invention. The chromate oxidation step is applicable to the range of alkyl hydrocarbons discussed above, but the best results with an air-alkali metal carbonate oxidation will be obtained on alkyl benzenes and the use of this process is not preferred for naphthalenes and other polynuclear fused ring compounds because of a tendency to cause destructive oxidation of the nucleus of such compounds.

Figure 1:
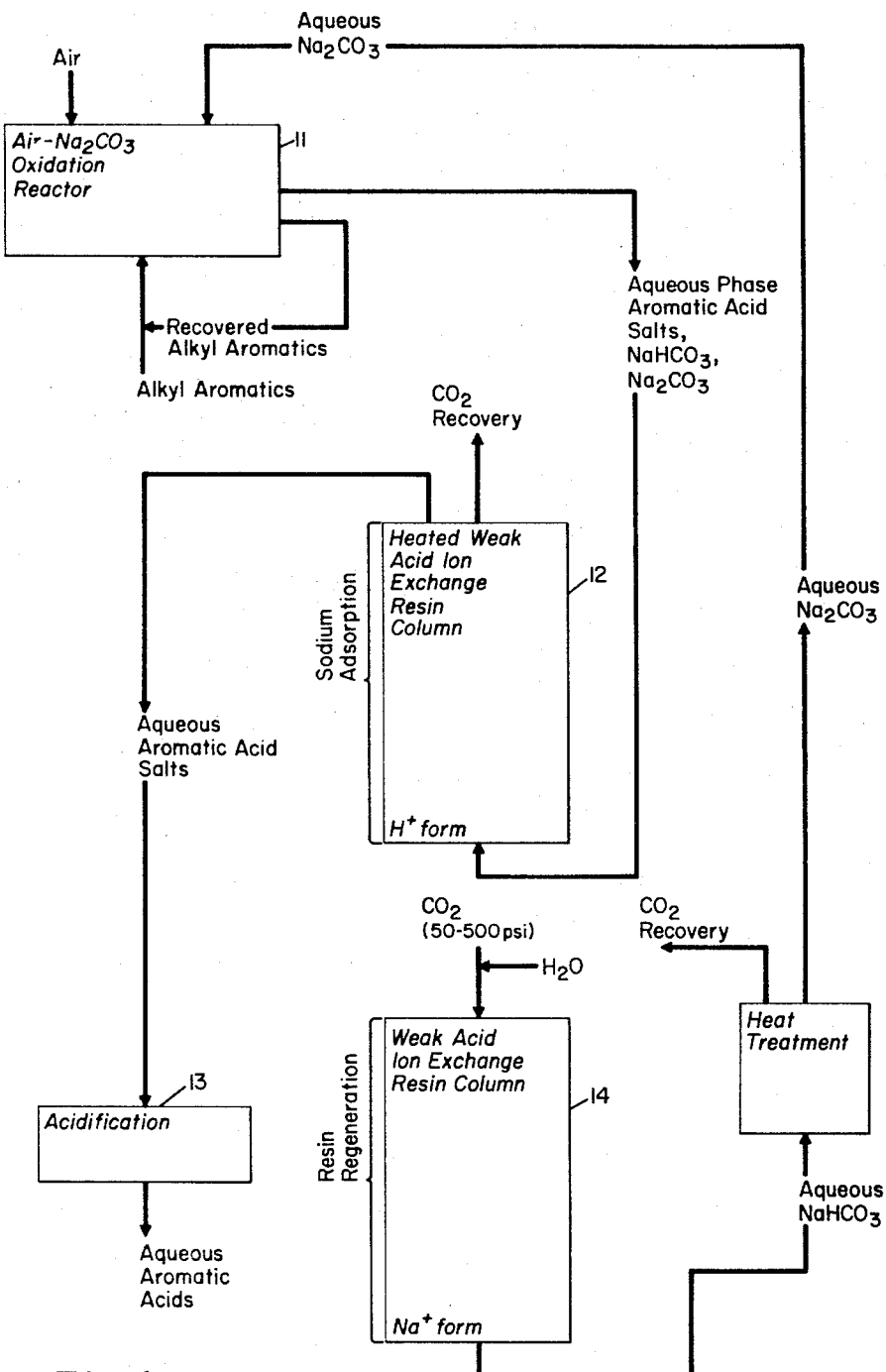
FIGURE 1 is a schematic drawing which illustrates the invention as applied to a process for the air oxidation of alkylaromatics in the presence of sodium carbonate.

In FIGURE 1 the alkylaromatics are added to the oxidation reactor 11 together with air and aqueous sodium carbonate. The oxidation may be on the batch basis but will be preferably conducted on a continuous basis and the pressures within the oxidation reactor will typically be from 250 to about 10,000 p.s.i. with pressures of 500 to about 3,000 p.s.i. being preferred. Temperatures within the oxidation reactor will be from about 150 to about 400° C. with temperatures of from 180 to 350° C. being preferred. Catalysts may be advantageously employed in the oxidation reaction but are not essential.

The unreacted alkylaromatic is separated out and recycled back to the oxidation reactor. Separation may in most instances be accomplished by decantation but fractional distillation and other conventional separatory methods may be employed.

The aqueous solution of aromatic acid salts, $NaHCO_3$ and $Na_2CO_3$, is transferred to the weak acid, that is, weak protonic ion exchange resin column 12. Any of the commercially available weak protonic ion exchange resins may be employed in this column but carboxylic acid resins, e.g., Amberlite IRC-50, manufactured by the Rohm and Haas Company, Philadelphia, Pa., are especially preferred. Contact with the ion exchange resin may also be accomplished on a batch basis but continuous operation of the ion exchange column is preferred. The column is operated at atmospheric pressure in virtually all cases and is maintained at temperatures of from about 0 to 100° C. with temperatures of from 75 to 90° C. being preferred. In a carboxylic acid ion exchange resin column, the sodium bicarbonate is neutralized forming $CO_2$ and water according to the following reaction:

$$\text{Resin-CO}_2\text{H} + \text{NaHCO}_3 \xrightarrow{\text{(Heat)}} \text{Resin-CO}_2\text{Na} + \text{H}_2\text{O} + \text{CO}_2$$

The $CO_2$ thus evolved is preferably recovered for use in the oxidation of alkylaromatics by $CO_2$ in the presence of alkali metal chromates, as mentioned above and to be described more fully hereafter.

The aqueous effluent from the weak protonic ion exchange resin column contains virtually pure sodium salt of the alkylaromatic acid (sodium benzoate in the case where toluene was an alkylaromatic feed material). The sodium salt may be converted to the corresponding alkylaromatic acid by acidifying with a mineral acid preferably sulfuric acid, or may alternatively be concentrated and converted to benzoic acid by the process for the conversion of alkylaromatic esters to acids described in our copending application of the same assignee, Ser. No. 420,-502, filed Dec. 23, 1964, by James W. Patton and Marion O. Son, Jr.

Where the metal salts themselves are the desired product they can, of course, be recovered from the ion exchange column effluent by conventional separatory means, and the acidification step can be omitted.

FIGURE 1 shows the conversion of the sodium salt of the aromatic acid to the acid by treatment with sulfuric acid in an acidification reactor 13, in which the following reaction occurs where toluene is the alkylaromatic fed to the process:

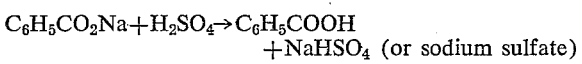

$C_6H_5CO_2Na + H_2SO_4 \rightarrow C_6H_5COOH + NaHSO_4$ (or sodium sulfate)

Sodium sulfate will be formed in place of $Na_2HSO_4$ when a barely stoichiometric amount of sulfuric acid is employed. In general, an excess over the stoichiometric amount of sulfuric acid will be preferred in order to insure complete conversion of the alkylaromatic ester to the acid. Temperature in the acidification reactor will generally be from 0 to about 200° C. with temperatures of from 20 to 60° C. being preferred. Pressures will preferably be atmospheric.

The aromatic acids will be separated from the aqueous $Na_2SO_4$ or $NaHSO_4$ solutions by any practical conventional means and preferably in most instances by filtration or centrifugation.

After the ion exchange resins in ion exchange column 12 have become exhausted, that is, are converted to the sodium form, they may be regenerated to the protonic (acid) form by passing water and $CO_2$ under pressure through the column. In FIGURE 1, exhausted column 14 is shown being regenerated with $CO_2$ at from about 50 to about 500 p.s.i. pressure and water being passed through the column. The effluent from the column during regeneration is an aqueous solution of sodium bicarbonate which is fed to heat treatment reactor 15 where it is decomposed to aqueous $Na_2CO_3$ solution and $CO_2$. The $CO_2$ is recovered for use in ion exchange resin regeneration or in the oxidation of additional quantities of alkylaromatics according to the process hereinafter described. The aqueous sodium carbonate solution is fed to oxidation reactor 11 where it is utilized in the air oxidation of additional quantities of alkylaromatics.

Figure 2:
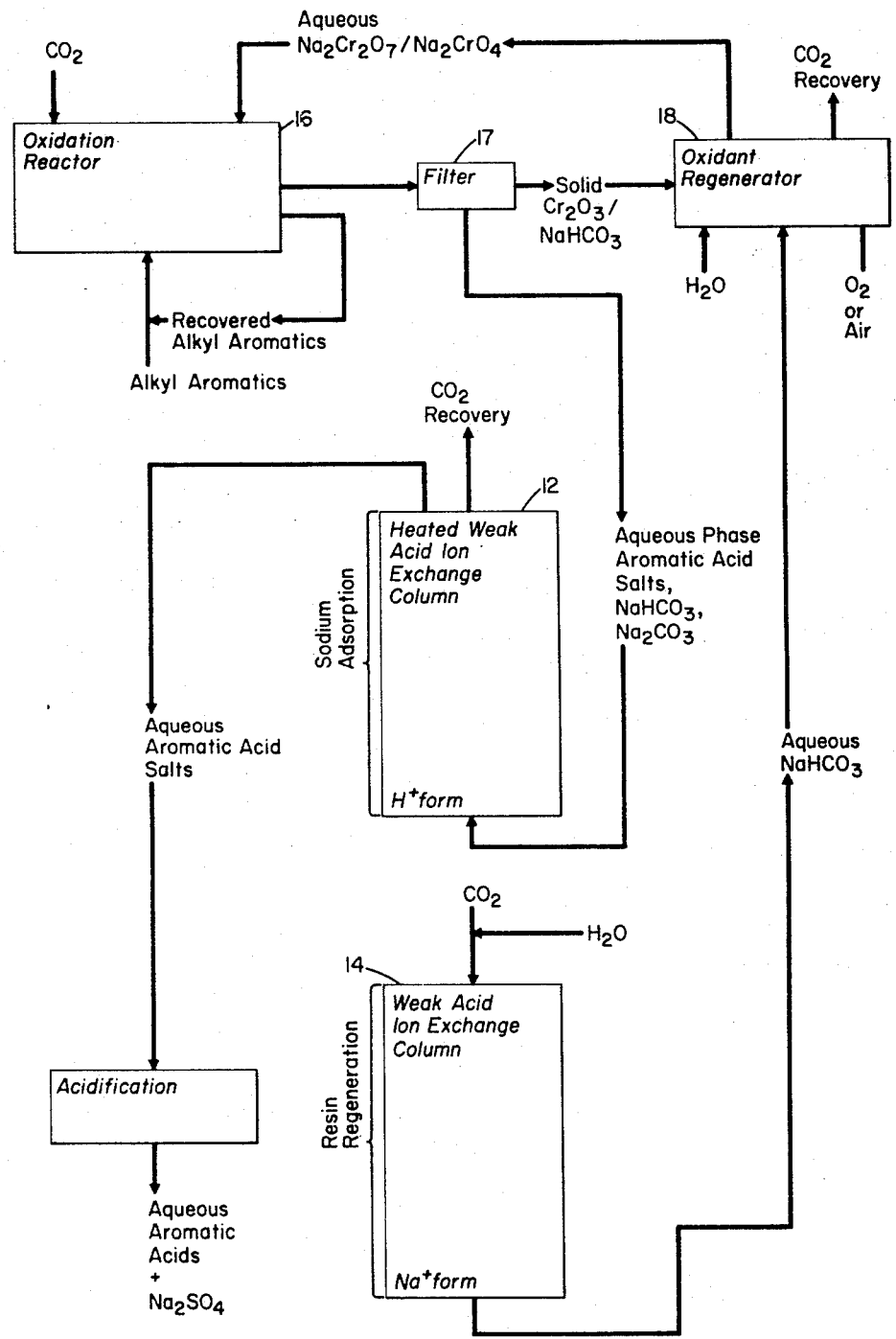
FIGURE 2 is a schematic drawing illustrating the invention as applied to a process for the oxidation of alkylaromatics by $CO_2$ in the presence of $Na_2Cr_2O_7/Na_2CrO_4$.

FIGURE 2 shows a process for $CO_2$-chromate oxidation of alkylaromatics.

In FIGURE 2, alkylaromatics are fed to oxidation reactor 16 together with $Na_2Cr_2O_7$ or a mixture of $Na_2CrO_4$ and $Na_2Cr_2O_7$, preferably in aqueous solution and with $CO_2$, and are oxidized to the corresponding sodium salts. The total pressure in chromate oxidation reactor 16 will be from about 0 to about 5,000 p.s.i. with pressures of from 1,000 to about 1,500 p.s.i. being preferred. The temperature will be from about 230 to about 300° C. The $CO_2$ will be added under a partial pressure of 100 to about 1,100 p.s.i. or even higher. The sodium chromate will be added preferably as an aqueous solution of

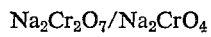

$Na_2Cr_2O_7/Na_2CrO_4$

Unreacted alkylaromatics will be separated from the effluent product stream by decantation or by other conventional separatory methods, and will be recycled back to the inlet of the oxidation reactor.

The product stream is then filtered in filter 17 to separate out solid $CR_2O_3/NaHCO_3$. This solid byproduct mixture may be fed to oxidant regenerator 18, heated, preferably to from 230 to 290° C. Water, together with oxygen, either pure or in the form of air, is fed to oxidant regenerator 18 at from about 50 to 200 p.s.i. or higher and the effluent from the oxidant regenerator is an aqueous solution of $Na_2Cr_2O_7/Na_2CrO_4$ together with $CO_2$. The solution of $Na_2Cr_2O_7/Na_2CrO_4$ can in most cases be fed directly back to oxidation reactor 16 and the $CO_2$ is preferably fed directly to the same reactor, Where necessary, the $Na_2Cr_2O_7/Na_2CrO_4$ solution can be concentrated by evaporation prior to recycling.

The aqueous effluent from filter 17 consists of aromatic acid salts (the sodium esters of the alkylaromatics) together with $NaHCO_3$ and $Na_2CO_3$.

This aqueous effluent from the filter is then fed to heated weak protonic (acid) ion exchange resin column 12 just as in the air-$Na_2CO_3$ oxidation described in FIGURE 1. It should also be understood that the chromate oxidation may be practiced just as shown in FIGURE 2 entirely independently of any air oxidation reaction, and that the air oxidation shown in FIGURE 1 may also be practiced independently of the chromate oxidation shown in FIGURE 2.

The sodium aromatic salts from the weak protonic ion exchange column are acidified or otherwise converted to the corresponding aromatic acids as described above.

The regeneration of the exhausted ion exchange column 14 requires $CO_2$ as above mentioned and the $NaHCO_3$ formed may be added to the $Cr_2O_3/NaHCO_3$ solid mixtures in the oxidant regenerator 18. The $CO_2$ from the oxidant regenerator 18 together with the $CO_2$ obtained during the treatment of the effluents of both of the oxidation processes by the weak acid ion exchange column can be used to oxidize further alkylaromatics in chromate oxidation reactor 16.

While the above mentioned processes have been described as involving $Na_2CO_3$, $NaHCO_3$, $Na_2Cr_2O_7$, and $Na_2CrO_4$, it should be understood that sodium is intended to be merely exemplary of the cations which may be employed and that any of the corresponding alkali metal salts having suitable solubility and reactivity and even the corresponding salts of other suitable cations may be employed in the process.

Also the invention should be understood to be operable on either a batch or a continuous basis.

EXAMPLE I

Preparation of benzoic acid and sodium benzoate from toluene

Utilizing an equipment system similar to that described in FIGURE 2, there is fed to a 500 gallon pressure type agitated oxidation reactor 303.9 pounds of toluene (a 10% excess over stoichiometric quantity), roughly 220 pounds of $CO_2$ (an amount necessary to maintain the below mentioned reactor pressure), and an aqueous $Na_2Cr_2O_7/Na_2CrO_4$ solution consisting of 670.5 pounds of sodium dichromate ($Na_2Cr_2O_7 \cdot 2H_2O$), 351.0 pounds of sodium chromate ($Na_2CrO_4 \cdot 4H_2O$), and 2,057 pounds of water. The oxidation reactor operates at about 1,500 p.s.i.g., maintained by the $CO_2$ feed and at 260° C. This temperature and pressure are maintained in the reactor for a period of about four hours. After recovery of the unreacted alkylaromatics (amounting to about 10% of the total toluene added) for later recycle to the reactor, the effluent from the oxidation reactor is filtered yielding solids consisting of 535 pounds of chromic oxide (as $Cr_2O_3 \cdot 1\frac{1}{2}H_2O$), 521 pounds of sodium bicarbonate, and 1.6 pounds of sodium carbonate. These solids are fed to an air-supplied oxidant regenerator operating at about 200 to 260° C. to form additional quantities of $CO_2$ and $Na_2Cr_2O_7/Na_2CrO_4$ aqueous solution for recycle to the oxidation reactor. Liquid effluent from the filter consists of 410 pounds of sodium benzoate, 71.1 pounds of sodium bicarbonate (12% of the total sodium bicarbonate in the effluent from the reactor), and 22.0 pounds of sodium carbonate (93% of the total sodium carbonate in the effluent from the reactor) the remainder being water. This aqueous phase is fed slowly to a heated weak protonic ion exchange column operating at about 200° F. and filled with about 300 pounds of Amberlite IRC–50, the Rohm and Haas weak protonic ion exchange resin. The aqueous phase from the filter is fed to the ion exchange column slowly over a period of about one hour. During this period $CO_2$ is evolved from the top of the ion exchange column and is recovered for later reuse. The effluent from the ion exchange column consists of about 410 pounds of sodium benzoate, the remainder being water. Treatment of this effluent with an amount of sulfuric acid which is approximately stoichiometric to the 410 pounds of sodium benzoate yields 347 pounds of benzoic acid which is recovered by filtration.

EXAMPLE II

When similar quantities of toluene are oxidized by air and aqueous $Na_2CO_3$ in apparatus similar to that shown in FIGURE 1, and the effluent from this reactor is directed to a weak protonic ion exchange resin column identical with the one utilized in Example I and operating under similar conditions, $CO_2$ is again evolved during the addition of the oxidation reactor effluent to the ion exchange resin column and aqueous aromatic salts are produced as the effluent from the column, nearly all basic constituents being neutralized by the ion exchange column. When the aqueous aromatic acid effluent from the ion exchange column is treated with sulfuric acid, benzoic acid is obtained in yields approximating those of Example I.

EXAMPLE III

When 1,3,5-trimethylbenzene is oxidized as in Example I, trimesic acid is produced.

EXAMPLE IV

When 1,2,4,5-tetramethylbenzene is oxidized as in Example I, pyromellitic acid is produced.

What is claimed is:

1. A process for manufacture of metal salts of alkylaromatic acids from alkylaromatic hydrocarbons comprising oxidizing the alkylaromatic hydrocarbons to form a product mixture comprising basic constituents and metal salts of alkylaromatic acids, neutralizing the basic constituents by passing at least a portion of the product mixture through a weak protonic ion exchange resin, and recovering the resulting metal salts of alkylaromatic acids.

2. The process of claim 1 wherein the alkylaromatic hydrocarbons are alkyl benzenes and the oxidation is accomplished by oxygen in the presence of an alkali metal carbonate, where $CO_2$ is evolved by the passage of the product of the oxidation through the weak protonic ion exchange resin and where the recovered $CO_2$ is thereafter used to regenerate weakly protonic ion exchange resin which has become substantially exhausted.

3. The process of claim 2 wherein the regeneration of the weak protonic ion exchange resin yields an alkali metal bicarbonate which is subsequently decomposed to yield additional $CO_2$ and an alkali metal carbonate for use in oxidation of subsequent quantities of alkylaromatic hydrocarbons.

4. The steps of claim 1 wherein regeneration of the weak protonic ion exchange resin subsequent to the neutralization of the reaction product formed by oxidation of alkylaromatic hydrocarbons in the presence of $CO_2$ and an alkali metal chromate yields an alkali metal bicarbonate which is subsequently reacted with $Cr_2O_3$ to produce additional alkali metal chromates for oxidation of additional quantities of alkylaromatic hydrocarbons.

5. The process of claim 1 wherein the alkylaromatic acid salts comprise sodium benzoate.

6. The process of claim 3 wherein the alkylaromatic salts comprise sodium benzoate.

7. The process of claim 4 wherein the alkylaromatic acids comprise benzoic acid.

8. In a process for the manufacture of alkylaromatic acids from alkylaromatic hydrocarbons, the steps comprising oxidizing the corresponding alkylaromatic hydrocarbons to form a product mixture comprising basic constituents and metal salts of alkylaromatic acids, neutralizing the basic constituents by passing at least a portion of the product mixture through a carboxylic acid type of weak protonic ion exchange resin thereafter acidifying the product and recovering the resulting alkylaromatic acids.

9. The steps of claim 8 wherein the alkyl hydrocarbons are alkyl benzenes and the oxidation is accomplished by oxygen in the presence of an alkali metal carbonate, where alkali metal carbonate is produced by regeneration of the weak protonic ion exchange resin and is used to oxidize additional quantities of alkylaromatic hydrocarbons.

10. The process of claim 9 wherein the alkylaromatic acids comprise benzoic acid.

11. The process of claim 1 wherein the alkylaromatic acid salts comprise an alkali metal salt of trimesic acid.

12. The process of claim 1 wherein the alkylaromatic acid salts comprise an alkali metal salt of pyromellitic acid.

References Cited

UNITED STATES PATENTS

| 2,005,774 | 6/1935 | Demant | 260—524 |
| 2,120,672 | 6/1938 | Mares | 260—524 |
| 2,227,520 | 1/1941 | Tiger | 210—32 |
| 3,156,644 | 11/1964 | Kunin | 210—32 |

FOREIGN PATENTS 788,276  12/1957  Great Britain.

OTHER REFERENCES

Myers et al.: "Synthetic Resins as Exchange Adsorbents," Industrial & Engineering Chemistry, vol. 33 (June 1941), pp. 697–706.

HENRY R. JILES, *Primary Examiner.*

U.S. Cl. X.R.

260—525